(12) United States Patent
Johnson et al.

(10) Patent No.: US 9,335,545 B2
(45) Date of Patent: May 10, 2016

(54) HEAD MOUNTABLE DISPLAY SYSTEM

(71) Applicant: Caterpillar Inc., Peoria, IL (US)

(72) Inventors: Lonny E. Johnson, Peoria, IL (US); Michael D. Braunstein, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 194 days.

(21) Appl. No.: 14/154,619

(22) Filed: Jan. 14, 2014

(65) Prior Publication Data

US 2015/0199847 A1    Jul. 16, 2015

(51) Int. Cl.
| | |
|---|---|
| *G09G 5/00* | (2006.01) |
| *G02B 27/00* | (2006.01) |
| *G09G 5/377* | (2006.01) |
| *G02B 27/01* | (2006.01) |

(52) U.S. Cl.
CPC .......... *G02B 27/0093* (2013.01); *G02B 27/017* (2013.01); *G09G 5/377* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| | | | |
|---|---|---|---|
| 6,094,625 A | 7/2000 | Ralston | |
| 7,138,963 B2 | 11/2006 | Hobgood et al. | |
| 7,924,506 B2 * | 4/2011 | Rieger | G02B 27/017 359/407 |
| 2006/0079752 A1 * | 4/2006 | Anderl | A61B 19/52 600/407 |
| 2007/0247457 A1 * | 10/2007 | Gustafsson | F41G 1/00 345/420 |
| 2012/0019557 A1 * | 1/2012 | Aronsson | G06T 11/00 345/633 |
| 2012/0154441 A1 | 6/2012 | Kim | |
| 2013/0331730 A1 * | 12/2013 | Fenech | A61B 1/126 600/560 |
| 2014/0118829 A1 * | 5/2014 | Ma | G02B 5/1885 359/567 |
| 2014/0139676 A1 * | 5/2014 | Wierich | B60R 1/00 348/148 |
| 2014/0146075 A1 * | 5/2014 | Takasu | G02B 27/017 345/619 |

FOREIGN PATENT DOCUMENTS

| | | |
|---|---|---|
| WO | WO 03/060830 A1 | 7/2003 |
| WO | WO 2013/052855 A2 | 4/2013 |

* cited by examiner

*Primary Examiner* — Kee M Tung
*Assistant Examiner* — Frank Chen
(74) *Attorney, Agent, or Firm* — Leydig, Voit & Mayer, Ltd.

(57) ABSTRACT

A head mountable display system includes a visual image system, a head mountable display device including a display screen, and a headset pose sensor system. A controller is configured to generate a camera image based upon the image data, generate an augmented reality overlay based upon the position and the orientation of the operator's head relative to the work site, determine an image to be rendered on the head mountable display based upon the camera image and the augmented reality overlay, and render the image on the display screen.

15 Claims, 6 Drawing Sheets

HEAD MOUNTABLE DISPLAY SYSTEM

TECHNICAL FIELD

This disclosure relates generally to an image display system, and more particularly, to a head mountable system and method for selecting and rendering an image including image overlays and a camera view on a head mountable display device.

BACKGROUND

Movable machines such as haul trucks, dozers, motor graders, excavators, wheel loaders, and other types of equipment are used to perform a variety of tasks. For example, these machines may be used to move material and/or alter work surfaces at a work site. The machines may perform operations such as digging, loosening, carrying, etc., different materials at the work site.

Due to the size and configuration of these machines, an operator may have a limited field of view with respect to the environment in which a machine is operating. Accordingly, some machines may be equipped with image processing systems including cameras. The cameras capture images of the environment around the machine, and the image processing system renders the images on a display within an operator cab of the machine to increase the visibility around the machine.

While improving visibility, such image processing systems typically display the images on a display screen within the operator cab of the machine. Accordingly, to view an image on the display screen, an operator moves their eyes from viewing the work site to viewing the display screen. This eye movement may reduce the efficiency of an operator. In the alternative, an operator may not view the display screen as often as desired, which may result in missing visual indicators of obstacles at the work site.

A system that may be used to improve visibility is disclosed in U.S. Patent Application Publication 2012/0262580. The system of the '580 Publication provides a surround view from a vehicle by way of cameras positioned at various locations on the vehicle. The cameras can generate image data corresponding to the surround view, and a processing device can process the image data and generate the surround view on a simulated predetermined shape that can be viewed from a display. The simulated predetermined shape can have a flat bottom with a rectangular shape and a rim with a parabolic shape. Although the system of the '580 Publication may increase visibility, it does not necessarily increase safety as the entire surround view is displayed.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a head mountable display system for use at a work site includes a visual image system mounted on a machine for generating image data from a plurality of points of view relative to the machine, a head mountable display device configured to be mounted on an operator's head with the head mountable display device including a display screen, and a headset pose sensor system associated with the head mountable display device for generating headset pose signals indicative of a position and an orientation of the head mountable display device relative to the work site. A controller is configured to receive the image data from the visual image system, generate a camera image based upon the image data, and generate an augmented reality overlay based upon the position and the orientation of the operator's head relative to the work site. The controller is further configured to determine an image to be rendered on the head mountable display based upon the camera image and the augmented reality overlay and render the image on the display screen.

In another aspect, a controller-implemented method of operating a head mountable display system of an operator at a work site includes receiving image data from a visual image system mounted on a machine for generating image data from a plurality of points of view relative to the machine, generating a camera image based upon the image data, and generating an augmented reality overlay based upon a position and an orientation of an operator's head relative to the work site. The method further includes determining an image to be rendered on a head mountable display based upon the camera image and the augmented reality overlay and rendering the image on display screen of the head mountable display device.

In still another aspect, a machine includes a propulsion system, a visual image system mounted on the machine for generating image data of a work site from a plurality of points of view relative to the machine. A head mountable display device is configured to be mounted on an operator's head with the head mountable display device including a display screen and a headset pose sensor system is associated with the head mountable display device for generating headset pose signals indicative of a position and an orientation of the head mountable display device relative to the work site. A controller is configured to receive the image data from the visual image system, generate a camera image based upon the image data, and generate an augmented reality overlay based upon the position and the orientation of the operator's head relative to the work site. The controller is further configured to determine an image to be rendered on the head mountable display based upon the camera image and the augmented reality overlay and render the image on the display screen.

DETAILED DESCRIPTION

Figure 1:
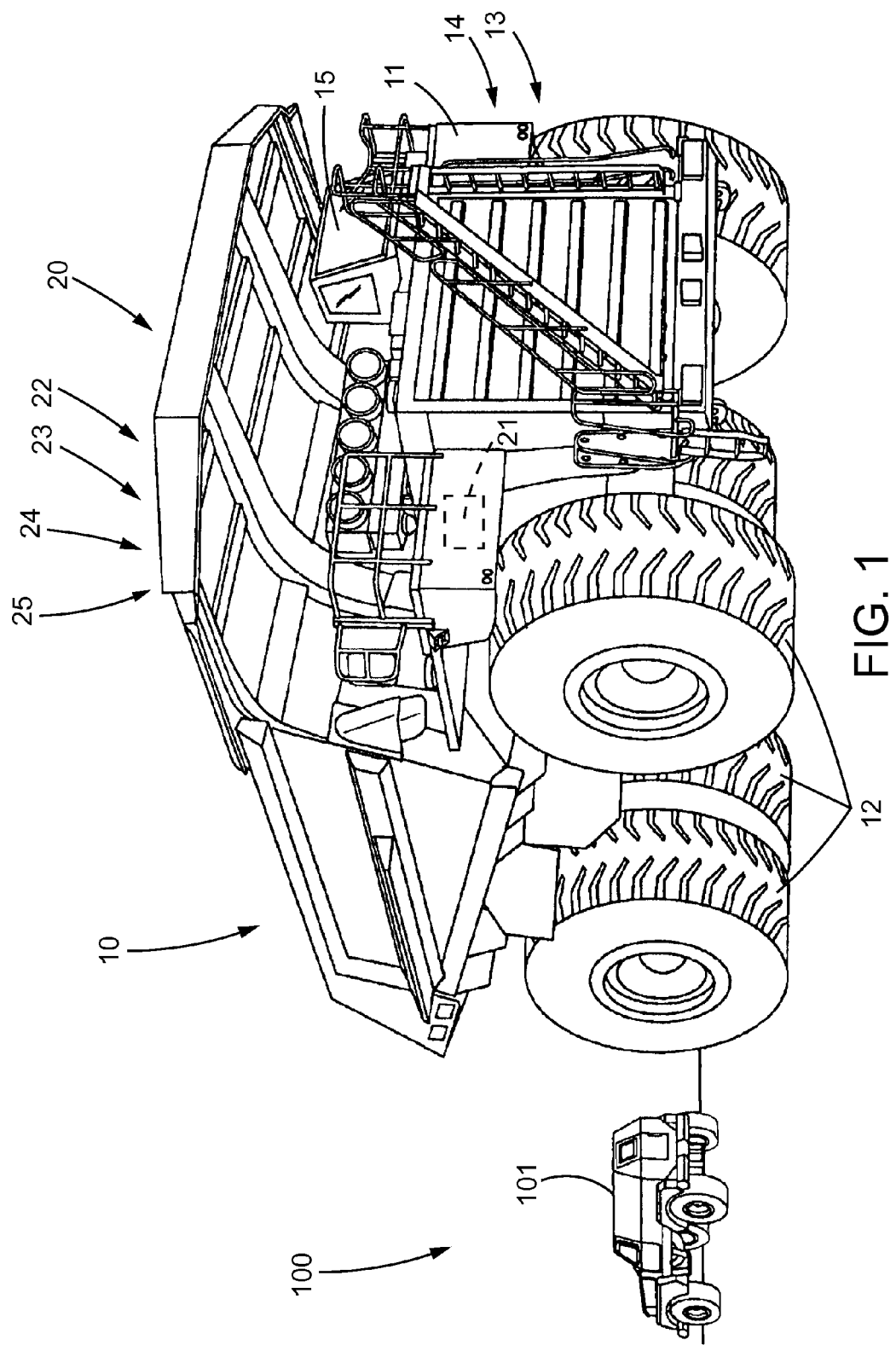
FIG. 1 is a perspective view of a machine at a work site in accordance with the disclosure.

FIG. 1 illustrates an exemplary work site 100 with a machine 10 operating at the work site. Work site 100 may include, for example, a mine site, a landfill, a quarry, a construction site, a road work site, or any other type of work site. Machine 10 may perform any of a plurality of desired operations or tasks at work site 100, and such operations or tasks may require the machine to generally traverse work site 100. Any number of machines 10 may simultaneously and cooperatively operate at work site 100, as desired. Machine 10 may embody any type of machine. For example, machine 10 may embody a mobile machine such as the haul truck depicted in FIG. 1, a service truck, a wheel loader, a dozer, or another type of mobile machine known in the art.

Machine 10 may include, among other things, a body 11 supported by one or more traction devices 12 and a propulsion system for propelling the traction devices. The propulsion system may include a prime mover 13, as shown generally by an arrow in FIG. 1 indicating association with the machine 10, and a transmission 14, as shown generally by an arrow in FIG. 1 indicating association with the machine 10, operatively connected to the prime mover. Machine 10 may include a cab or operator cab 15 that an operator may physically occupy and provide input to operate the machine.

Figure 2:
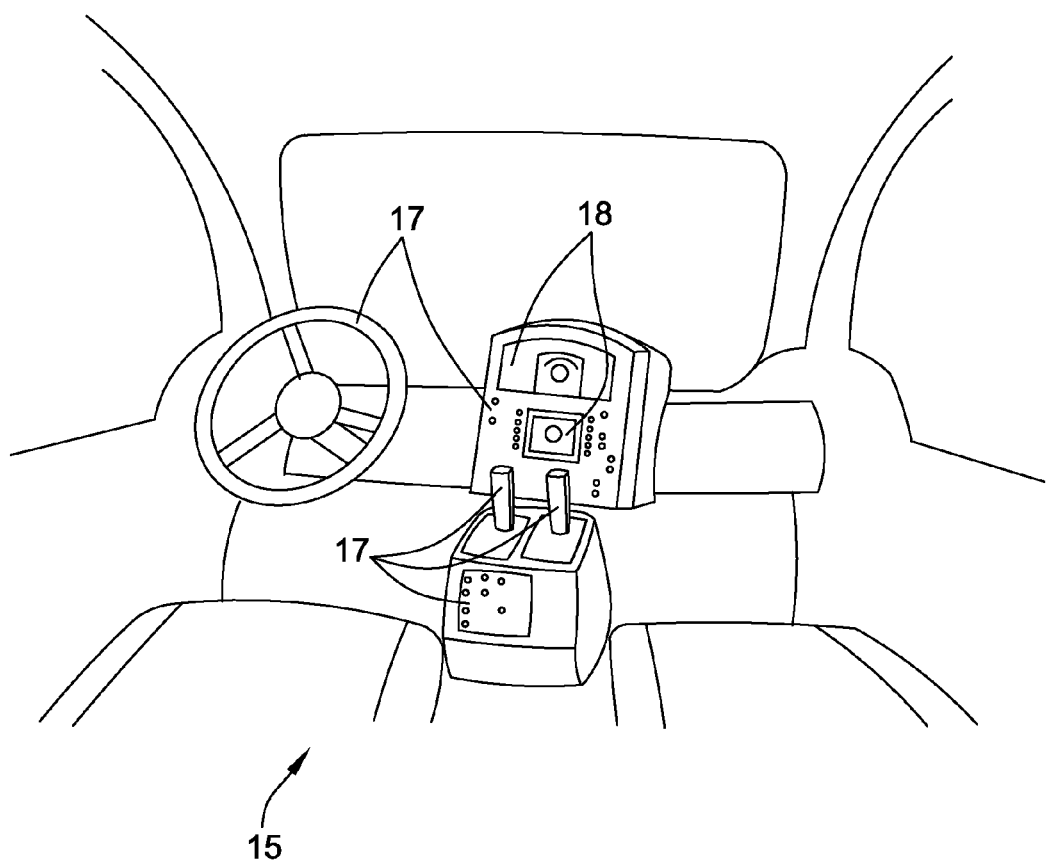
FIG. 2 is a diagrammatic view of an operator cab of the machine of FIG. 1.

Referring to FIG. 2, operator cab 15 may include an operator seat 16, one or more input devices 17 such as a steering wheel, levers, knobs, buttons, joysticks, etc. through which the operator may issue commands to control the operation of the machine 10 such as the propulsion and steering as well as operate various implements associated with the machine. One or more instrument arrays 18 may be positioned within the operator cab 15 to provide information to the operator and may further include additional input devices such as knobs and buttons.

Machine 10 may include a control system 20, as shown generally by an arrow in FIG. 1 indicating association with the machine 10. The control system 20 may utilize one or more sensors to provide data and input signals representative of various operating parameters of the machine 10 and the environment of the work site 100 at which the machine is operating. The control system 20 may include an electronic control module or controller 21 and a plurality of sensors associated with the machine 10.

The controller 21 may be an electronic controller that operates in a logical fashion to perform operations, execute control algorithms, store and retrieve data and other desired operations. The controller 21 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 21 such as power supply circuitry, signal conditioning circuitry, driver circuitry, and other types of circuitry.

The controller 21 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 21 may be implemented in hardware and/or software without regard to the functionality. The controller 21 may rely on one or more data maps relating to the operating conditions and the operating environment of the machine 10 and the work site 100 that may be stored in the memory of controller. Each of these data maps may include a collection of data in the form of tables, graphs, and/or equations.

The control system 20 and controller 21 may be located on the machine 10 or may be distributed with components also located remotely from the machine such as at a command center (not shown). The functionality of control system 20 may be distributed so that certain functions are performed at machine 10 and other functions are performed remotely. In such case, the control system 20 may include a communications system such as wireless network system (not shown) for transmitting signals between the machine 10 and a system located remote from the machine such as at the command center.

Machine 10 may be equipped with a plurality of machine sensors 22, as shown generally by an arrow in FIG. 1 indicating association with the machine 10, that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A pose sensing system 24, as shown generally by an arrow in FIG. 1 indicating association with the machine 10, may include a pose sensor 25, also shown generally by an arrow in FIG. 1 to indicate association with the machine, to sense the position and orientation (i.e., the heading, pitch, roll or tilt, and yaw) of the machine relative to the work site 100. The position and orientation of the machine 10 are sometimes collectively referred to as the pose of the machine. The pose sensor 25 may include a plurality of individual sensors that cooperate to generate and provide pose signals to controller 21 indicative of the position and orientation of the machine 10. In one example, the pose sensor 25 may include one or more sensors that interact with a positioning system such as a global navigation satellite system or a global positioning system to operate as a pose sensor. In another example, the pose sensor 25 may further include a slope or inclination sensor such as pitch angle sensor for measuring the slope or inclination of the machine 10 relative to a ground or earth reference. The controller 21 may use pose signals from the pose sensors 25 to determine the pose of the machine 10 within work site 100. In other examples, the pose sensor 25 may include an odometer or another wheel rotation sensing sensor, a perception based system, or may use other systems such as lasers, sonar, or radar to determine all or some aspects of the pose of machine 10.

If desired, the pose sensing system 24 may include distinct position and orientation sensing systems. In other words, a position sensing system (not shown) may be provided for determining the position of the machine 10 and a separate orientation sensing system (not shown) may be provided for determining the orientation of the machine.

While operating at work site 100, machine 10 may encounter one or more obstacles 101. Obstacle 101 may embody any type of object including those that are fixed or stationary as well as those that are movable or that are moving. Examples of fixed obstacles may include infrastructure, storage, and processing facilities, buildings, and other structures and fixtures found at a work site. Examples of movable obstacles may include machines, light duty vehicles (such as pick-up trucks and cars), personnel, and other items that may move about work site 100.

Figure 3:
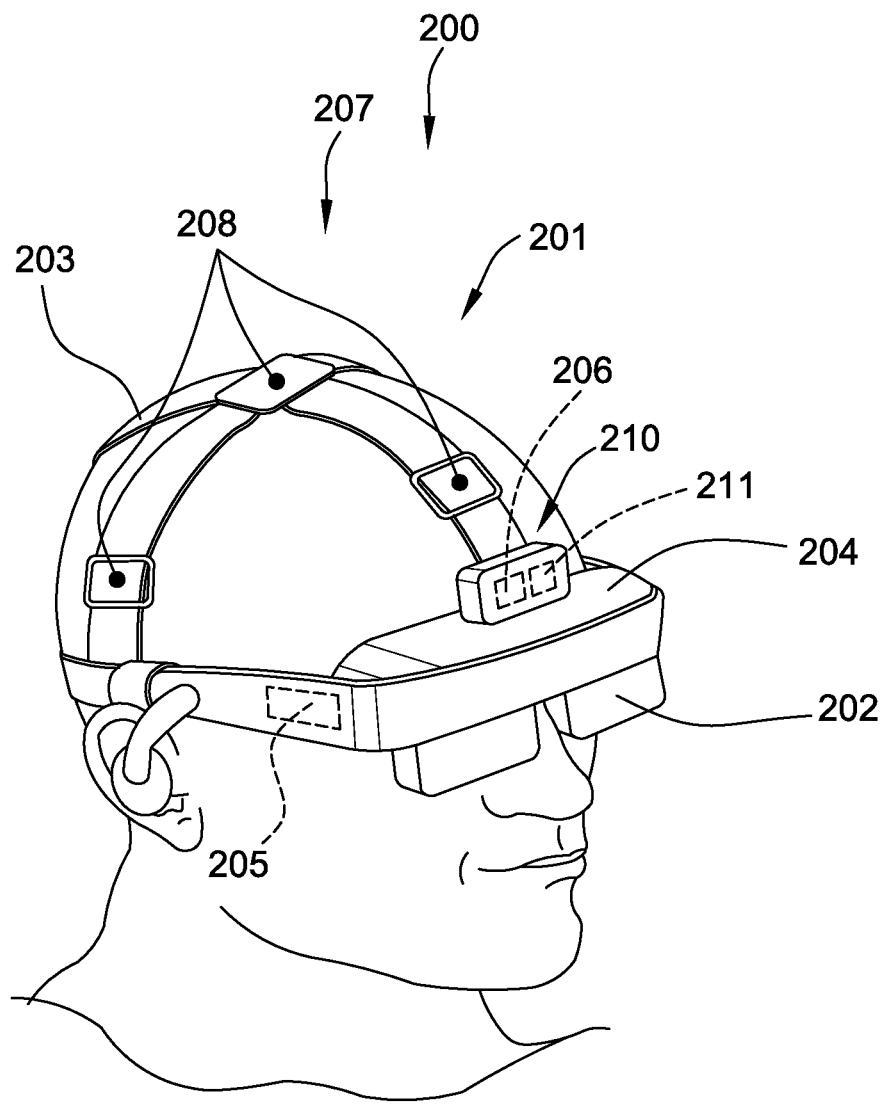
FIG. 3 is a diagrammatic perspective view of a head mountable display device.

To reduce the likelihood of a collision between machine 10 and an obstacle 101, an object detection system 30 may be mounted on or associated with the machine, as shown generally by an arrow in FIG. 3 indicating association with the machine 10. The object detection system 30 may include a radar system, a SONAR system, a LIDAR system, and/or any other desired system together with associated object detection sensors 31. Object detection sensors 31 may generate data that is received by the controller 21 and used by the controller to determine the presence and position of obstacles 101 within the range of the sensors. The field of view of each object detection sensor 31 is depicted schematically in FIG. 3 by reference number 32.

An object identification system 33 may be mounted on or associated with the machine in addition to the object detection system 30, as shown generally by an arrow in FIG. 3 indicating association with the machine 10. In some instances, the object detection system 30 and the object identification system 33 may be integrated together. Object identification sensors 34 may generate data that is received by the controller 21 and used by the controller to determine the type of obstacles detected by the object detection system 30. The object identification sensors 34 may be part of or replace the object detection sensors 31 and thus are depicted schematically as the same components in FIG. 3. In an alternate embodiment, the object identification sensors may be separate components from the object detection sensors 31.

The object identification system 33 may operate to differentiate categories of objects detected such as machines, light duty vehicles, personnel, or fixed objects. In some instances, the object identification system 33 may operate to further identify the specific object or type of object detected.

Object identification system 33 may be any type of system that determines the type of object that is detected. In one embodiment, the object identification system 33 may embody a computer vision system that uses edge detection technology to identify the edges of a detected object and then matches the detected edges with known edges contained within a data map or database to identify the object detected. Other types of object identification systems and methods of object identification are contemplated.

In an alternate or supplemental embodiment, controller 21 may include or access an electronic map of the work site 100 including the position of machine 10 and the positions of various known obstacles 101 at the work site. The object detection system 30 may utilize the electronic map of the work site 100 together with the position data of the machine 10 from the position sensing system 23 to determine the proximity of the machine to any obstacles 101. The electronic map of the work site 100 may also include the type of object in addition to its location and the object identification system 33 may use this information to determine the type of obstacle 101 at the work site.

Still further, the object identification sensors 34 may comprise RFID sensors and certain objects or obstacles 101 at the work site 100 may be equipped with RFID chips or tags (not shown). The object identification system 33 may be configured to read RFID chips of any obstacles 101 that are within a predetermined range to identify such obstacles.

To assist an operator within operator cab 15 of machine 10, an operator may be equipped with a wearable system such as a head mountable display device 201 that is part of a head mountable display system 200 (FIG. 3). The head mountable display device 201 is configured to display an image or virtual objects (e.g., graphical media content such as text, images, and/or video) on a substantially transparent display screen 202. The transparency of the display screen 202 permits the operator to maintain a view the physical environment while also viewing the virtual text and/or images that are displayed over their physical field of vision to augment the image seen by the operator. Such augmented image is sometimes referred to as augmented reality or augmented vision.

Head mountable display device 201 may include an adjustable strap or harness 203 that allows the head mountable display system to be worn about the head of the operator. The head mountable display system 200 may include a visor or goggles 204 with transparent lenses that function as the display screen 202 through which the operator views the physical environment. One or more image projectors 205 may direct images onto the display screen 202 within the operator's line of sight.

The image projector 205 may be an optical projection system, light emitting diode package, optical fibers, or other suitable projector for transmitting an image. The display screen 202 may be configured to reflect the image from the image projector 205, for example, by a thin film coating, tinting, polarization or the like. The display screen 202 also may be a beam splitter, as will be familiar to those of skill in the art. Thus, while the display screen 202 can be transparent to most wavelengths of light, it reflects selected wavelengths such as monochromatic light back to the eyes of the operator. Such a device is sometimes referred to as an "optical combiner" because it combines two images, the real world physical environment and the image from the image projector 205. In still other embodiments, it may be possible to configure the image projector (such a laser or light emitting diode) to draw a raster display directly onto the retina of one or more of the user's eyes rather than projecting an image onto the display screen 202. Other configurations are contemplated. Regardless of the type of image projector 205, the projected images appear as an overlay superimposed on the view of the physical environment thereby augmenting the perceived environment.

A headset controller 206, which may be a portion of controller 21 and include a processor or other electronics, may be provided on head mountable display device 201. The headset controller 206 may transmit and receive data between the head mountable display system 200 and other portions of control system 20. Controller 21 may control the projection of the images on the display screen 202 and determine the images to be projected by the image projector 205, either at the headset controller 206, at portion of controller 21 that is remote from the head mountable display device 201, or by a combination of the two components.

The head mountable display system 200 may also include a headset pose sensor system 207 used to determine the orientation and position or pose of the head of the operator. For example, the headset pose sensor system 207 may include a plurality of headset pose sensors 208 that generate signals that the controller 21 may use to determine the pose of the operator's head. In one example, the headset pose sensors 208 may be Hall effect sensors that utilize the variable relative positions of a transducer and a magnetic field to deduce the direction, pitch, yaw and roll of the operator's head. In another example, the headset pose sensors 208 may interact with a positioning system such as a global navigation satellite system or a global positioning system to determine the pose of the operator's head. The data obtained by the headset pose sensors 208 may be used together with the pose of the machine 10 to determine the specific orientation of the operator's field of view relative to the work site 100.

A mapping system 210 may be positioned on head mountable display device 201 to scan the area in proximity to the operator (i.e., within the operator cab 15) to determine the extent to which the operator's view is obstructed and to assist in positioning images generated by the head mountable display system 200. The mapping system 210 may also be combined with the pose sensing system 24 of machine 10 to operate as an alternate headset pose sensor system 207. The mapping system 210 may include one or more mapping sensors 211 that may scan the area adjacent the operator to gather information defining the interior of the operator cab. More specifically, mapping sensors 211 may determine the distance and direction from the mapping sensors 211 to points that define a mapped surface of the interior of the operator cab 15. Mapping sensors 211 may, in addition or alternatively, gather other information about points of the interior of the operator cab 15, such as, for example, the color of the surface at each location, if desired.

Mapping sensors 211 may embody LIDAR (light detection and ranging) devices (e.g., a laser scanner) 302, RADAR (radio detection and ranging) devices, SONAR (sound navigation and ranging) devices, camera devices, and/or other types of devices that may determine the range and direction to objects and/or attributes thereof. Mapping sensors 211 may be used to sense the range, the direction, the color, and/or other information or attributes about the various points along the surface of the interior of the operator cab 15 and generate mapping signals indicative of such sensed information and attributes.

In an example using a LIDAR device, the mapping sensors 211 may sense or determine the range from the LIDAR device for each position along the mapped surface. Such range may be used to determine the coordinates of each point sensed by the mapping sensors 211. In an example using a camera device, the mapping sensors 211 may be part of a computer vision system that uses the sensed colors and edge detection technology to identify the edges of the interior surface of the operator cab 15 and then matches the detected edges with known edges contained within a data map or database to determine the pose of the head mountable display system 200 and/or the extent to which the vision of the operator is blocked. Other configurations of the mapping sensors 211 are contemplated.

The data for each point of the surface of the interior of the operator cab 15 may have a have a unique identifier such as a set of coordinates sufficient to define a location of the particular point on the surface with respect to a coordinate system (e.g., Cartesian, polar, or spherical coordinate data). In addition, the data may further include the time at which the data was collected. For example, data for each point may be stored in the form of x, y, z, and t where x, y, and z correspond to Cartesian coordinates and t is the time of the data collection. Each of the points on surface of the interior of the operator cab 15 may also include one or more additional attributes such as the color of the particular location on the surface, if desired.

Head mountable display system 200 may be used to generate an overlay that increases the efficiency and safety of the operation of the machine 10. For example, the head mountable display system 200 may display parallel lines along the path of movement of the machine 10 that are predetermined distances from sides of the machine. In one example, the lines may be 5 feet, 10 feet, and 25 feet from the sides of the machine 10.

In another example, the head mountable display system 200 may be used to highlight or otherwise identify to an operator objects that have been detected by the object detection system 30. In doing so, the type of object detected, and the distance to the object may be highlighted or otherwise identified. In one example, different color overlays may be used depending on the type of object detected. In another example, the color of the overlay may change depending on the distance to such object. If desired, aspects of the overlay may also flash or change to provide an additional visual warning to an operator. Overlays may also be task-based to assist in operating machine 10 such as by rendering a target position and a target path to assist an operator in completing a desired task.

In some instances, the operator cab 15 may be positioned to minimize blind spots of machine 10 (i.e., maximize the unobstructed area viewable by an operator or operators of machine 10). However, because of the size and configuration of some machines 10, the blind spots may be relatively large. As a result, obstacles or objects may sometimes be located within a blind spot and thus not directly visible to an operator.

Figure 4:
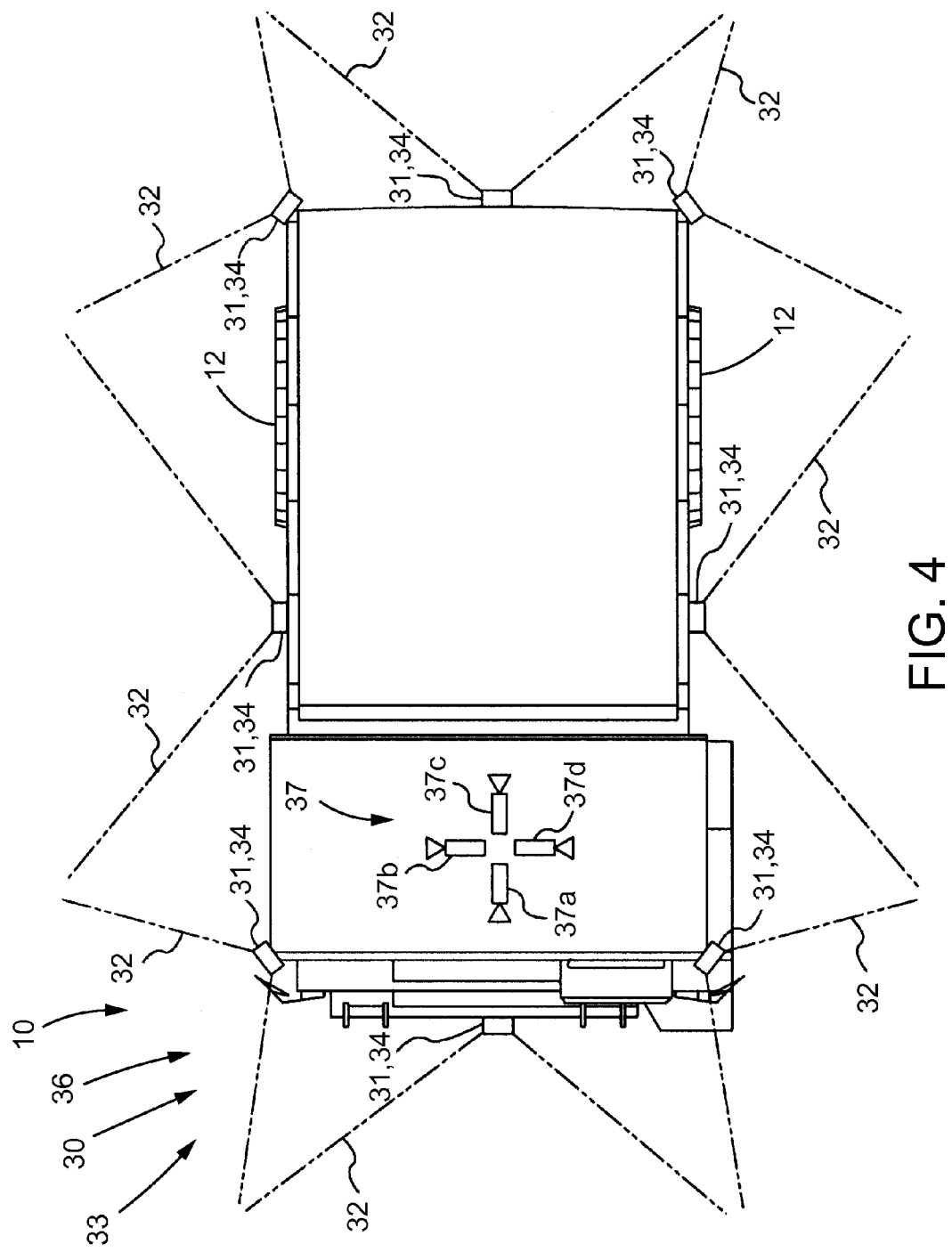
FIG. 4 is a top plan view of another machine in accordance with the disclosure.

To increase the operator's field of view of the area surrounding the machine, machine 10 may include an image display system 35, shown generally by an arrow in FIG. 4 to indicate association with the machine. The image display system 35 may include the object detection system 30 and the object identification system 33 described above together with a visual image system 36 mounted on or associated with the machine, as shown generally by an arrow in FIG. 3 indicating association with the machine 10. The image display system 35 may be used to generate views of the environment around machine 10 which may then displayed on display screen 202 of head mounted display device 201. Thus in addition to projecting images to augment the images of the physical environment viewed by the operator, under some circumstances, the image projectors 205 of head mountable display device 200 may also display images generated by the image display system 35.

The visual image system 36 may include a plurality of visual image sensors such as cameras 37 for generating image data from a plurality of points of view relative to the machine 10. Each camera 37 may be mounted on the machine 10 at a relatively high vantage point such as at the top of the frame of the machine or the roof. As depicted schematically in FIG. 4, four cameras 37 are provided that record or sense images in the forward and rearward directions as well as to each side of machine 10. In the embodiment depicted in FIG. 1, the cameras 37 may be positioned in other locations but may face in the same directions as depicted in FIG. 4. Controller 21 may receive image data from the cameras 37 and generate video or still images based upon such images.

Figure 5:
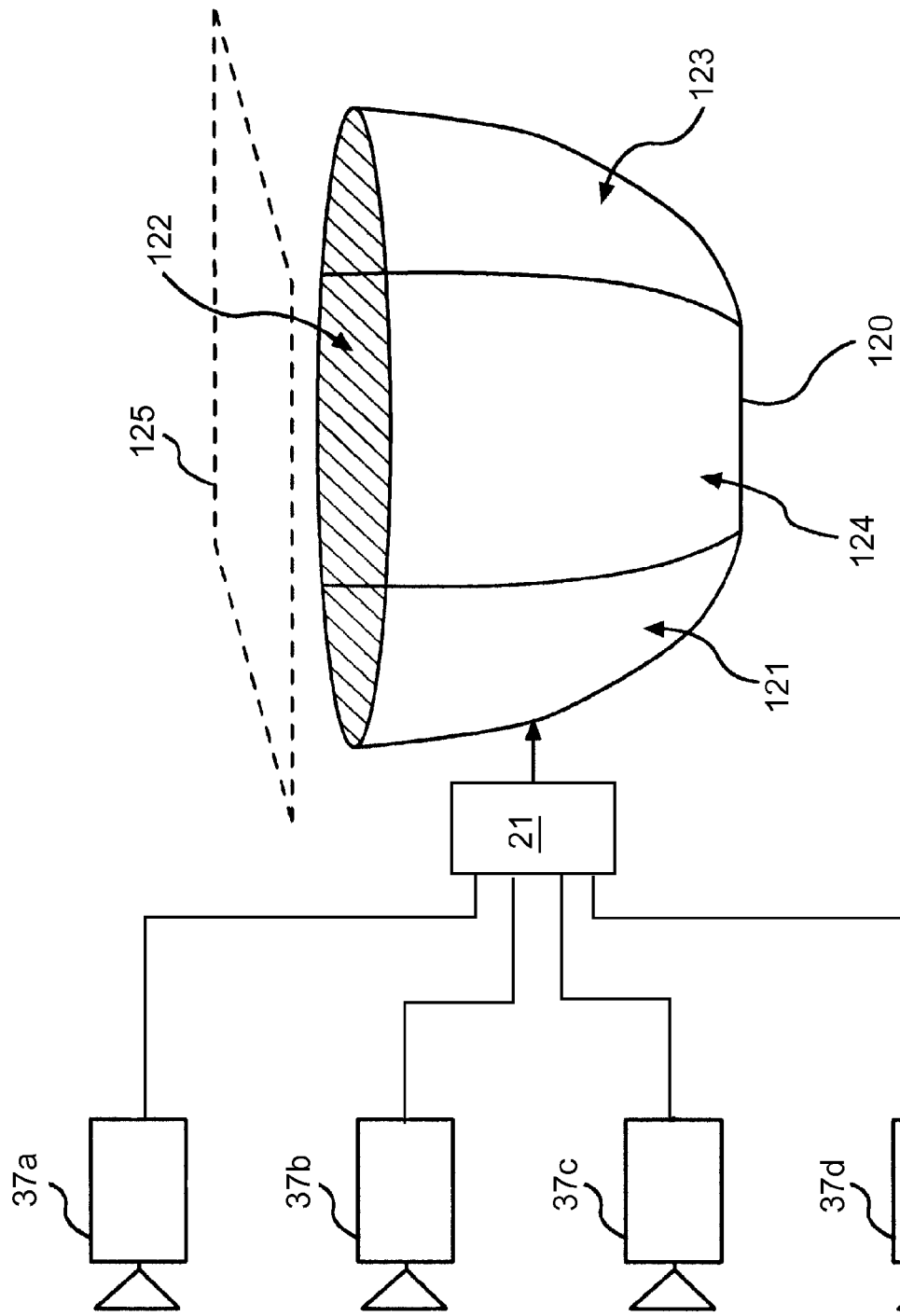
FIG. 5 is a schematic view of a visual image system generating an unified image in accordance with the disclosure.

In some embodiments, controller 21 may combine the image data captured by the cameras 37 into a unified image 120 of a portion of the work site 100 adjacent and surrounding the machine 10 depicted. FIG. 5 is a pictorial illustration of one example of controller 21 combining image data from each of the cameras 37 to generate the unified image 120. The unified image 120 may represent all image data available for the environment of machine 10. In one example, the unified image 120 represents a 360-degree view or model of the environment of machine 10, with machine 10 at the center of the 360-degree view. According to some embodiments, the unified image 120 may be a non-rectangular shape. For example, the unified image 120 may be hemispherical and machine 10 may be conceptually located at the pole, and in the interior, of the hemisphere.

Controller 21 may generate the unified image 120 by mapping pixels of the image data captured by the cameras 37 to a pixel map. The pixel map may be divided into sections, with each section corresponding to one set of image data. For example, as shown in FIG. 4, front or first camera 37a captures image data that is mapped to section 121, right or second camera 37b captures image data that is mapped to section 122, rear or third camera 37c captures image data that is mapped to section 123, and left or fourth camera 37d captures image data that is mapped to section 124. Pixels may be mapped directly using a one-to-one or one-to-many correspondence, and the mapping may correlate a two dimensional point from the image data to a three dimensional point on the map used to generate the unified image 120. For example, a pixel of the image data located at (1, 1) may be mapped to location (500, 500, 1) of the unified image. The mapping may be accomplished using a look-up table that may be stored within controller 21. The look-up table may be configured based on the position and orientation of each camera 37 on machine 10. Although a look-up table is one method by which controller 21 may map the image data to the unified image 120, those skilled in the art will appreciate that other methods for mapping image data may be used to achieve the same effect.

Controller 21 may also use parameters associated with cameras 37 to map pixels from the image data to the unified image 120. The parameters may be included in metadata of the image data. For example, the parameters may include the position of each camera 37 with respect to machine 10. Controller 21 may correlate sections 121-124 of the unified image 120 with machine 10, and controller 21 may use the correlations to determine which of the image data to map to each section. For example, controller 21 may correlate section 121 with the front of machine 10. When the controller receives image data from front or first camera 37a, the parameters included in the metadata associated with such image data may indicate that it was captured by first camera 37a. The parameters may also indicate that first camera 37a is positioned on the front of machine 10. Controller 21 may analyze the parameters and determine that certain image data should be mapped to section 121. Thus, as controller 21 accesses the image data, it can correctly map it to sections 121-124 of the unified image 120. Other manners of generating a unified image are contemplated.

Image display system 35 may be configured to select a portion of the unified image 120 and transmit such image for rendering on display screen 202 of head mounted display device 201. To do so, controller 21 may select the portion using a designated viewpoint. The viewpoint 125 depicted in FIG. 5 represents a plane from which the unified image 120 may be viewed, and the pixels located under the plane form the portion of the unified image 120 that is rendered on display screen 202 of head mounted display device 201. For example, as shown in FIG. 5, viewpoint 125 is positioned above the entire unified image 120, and all of the pixels of the unified image are located under viewpoint 125. With this designated viewpoint, the unified image is configured as a birds-eye or overhead view with the machine 10 centered therein and such image may be rendered on display screen 202.

Other viewpoints may be used to generate an image to be displayed. For example, the viewpoint 125 may be shifted laterally relative to the unified image 120 to provide a larger field of view of one portion or side of the operating environment around the machine 10. In such case, the controller 21 may render a shifted bird's eye view, which is based upon the bird's eye view but with the machine 10 shifted relative to the unified image 120. This may be desirable to emphasize the existence or details of objects detected on one or two sides of machine 10. In another example, controller 21 may generate images from a single point of view or direction such as by displaying an image indicative of image data from only one camera 37. Such viewpoint may be referred to as a directional view as it may correspond to a direction relative to the machine 10. In some circumstances, a directional view may be generated by data from a combination of two or more cameras 37. In some instances, a directional view may correspond to a state of the machine (e.g., correspond to a direction that the machine is moving or a state of the transmission such as neutral, drive, or reverse).

Image display system 35 may be further configured to add additional details to a rendered image such as by using an overlay similar to that described above. However, in this instance, the overlay is applied to the rendered image, rather than to the physical environment as viewed through the head mountable display system 200. As described above, the overlay may be based upon the type of object detected and the distance to such object.

As further described above, the overlays may also be task-based to assist in operating machine 10 such as by rendering a target position and a target path to assist an operator in completing a desired task. In an example, an overlay may be used to assist in positioning a haul truck for loading by a wheel loader. In such case, the object detection system 30 and the object identification system 33 may detect and identify the wheel loader. An image may be displayed based upon data from the rearwardly facing third camera 37c as well as the second camera 37b and the fourth camera 37d. An overlay may be depicted or rendered on the image highlighting certain components of the wheel loader and a target position for the haul truck as well projecting a desired path of the haul truck.

From the foregoing, it may be understood that the head mountable display system 200 may be used to not only project images to augment the view of the physical environment of the operator, but under some circumstances, also project or display images generated by the image display system 35. In doing so, the image display system 35 may determine the image to be projected based upon a plurality of factors including the state of the transmission of the machine 10 and the proximity of any objects detected near the machine. The desired image may be generated with data from the object detection system 30, the object identification system 33, and the visual image system 36.

Figure 6:
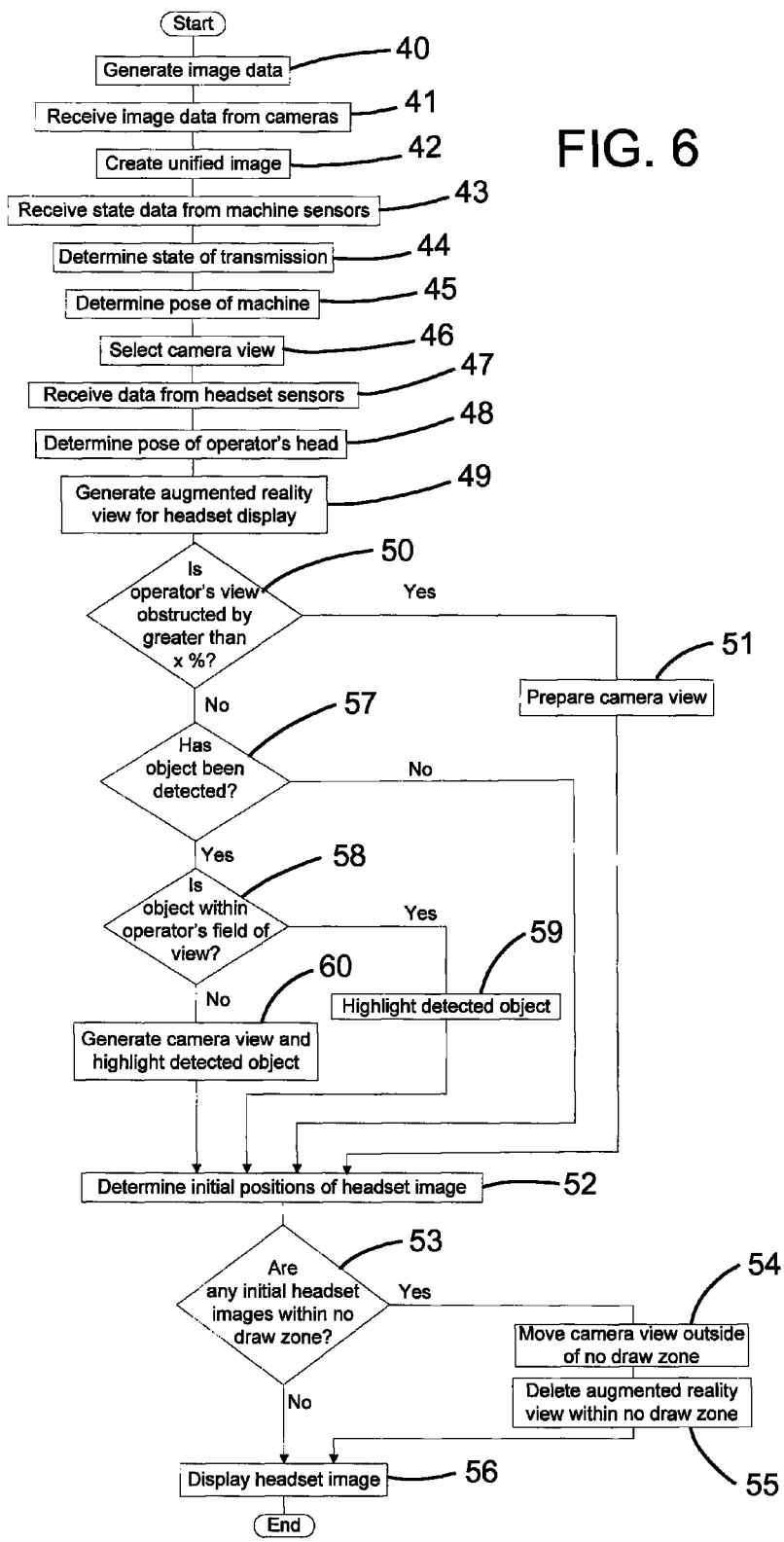
FIG. 6 is a flowchart of a process for selecting, generating, and displaying images on the head mountable display device.

Referring to FIG. 6, a flowchart of the process for generating and displaying images on the head mountable display system 200 is depicted. During the operation of machine 10, cameras 37 generate image data at stage 40 and controller 21 receives at stage 41 the image data from the cameras. Inasmuch as the cameras 37 face in a multiple directions, image data may be generated depicting the operating environment surrounding the machine 10. The image data may include images captured by cameras 37, as well as metadata including parameters associated with each of cameras 37. The parameters may describe the orientation of each camera 37, the position of each camera with respect to machine 10, and the range of each camera's field of view.

At stage 42, controller 21 may use the image data to generate a unified image 120 of the operating environment of machine 10 by combining the image data generated by the cameras 37 as described in more detail above. Controller 21 may receive at stage 43 state data from various machine sensors associated with the machine 10. For example, the state data may be used to determine the direction of travel and the speed of movement of the machine as well as the gear or setting of the transmission 14. At stage 44, the state data in the form of pose data from the pose sensor 25 may be used to determine the pose or position and orientation of the machine. The controller 21 may determine at stage 45, the state of the transmission 14.

Once controller 21 has generated the unified image 120, the controller may select at stage 46 a camera view to be rendered based upon a portion of the unified image 120, a directional view from one or more of the cameras 37, or another image that may be rendered on the display screen 202 of head mountable display system 200. The controller 21 may select the camera view to be rendered based upon a plurality of factors including the state of the transmission 14, the number of and proximity to any objects detected adjacent the machine 10, and the identity of any objects detected.

For example, if the transmission 14 is in neutral or park, and no objects are detected within a predetermined distance from the machine, the controller may generate a bird's eye or overhead view of the area surrounding the machine 10 that depicts the machine centered within the bird's eye view. The bird's eye view with the machine 10 centered therein is referred to herein as a standard bird's eye view. If more than one object is detected, the controller 21 may generate a standard bird's eye view of the area surrounding the machine 10 so that an operator within operator cab 15 may see all of the obstacles. If only one object is detected within the predetermined range from the machine 10, the controller 21 may generate a modified image such as a shifted bird's eye view in which the bird's eye view is shifted towards the object and the machine 10 is no longer centered within the view. In an alternate embodiment, the controller 21 may generate a directional view using the images from one or more cameras 37, If the transmission 14 is in drive or a forward gear, the operator will typically have some range of view from the operator cab 15 such that objects in front of the machine that are relatively far away are visible. As the machine 10 moves forward, the operator will likely be aware of objects in front of the machine based upon the operator's memory even if such objects are in a blind spot. However, if the machine has been stationary or moving in reverse, it is possible that one or more movable objects may have moved into a blind spot in front of the machine without the knowledge of the operator. Accordingly, when the transmission 14 is initially shifted into drive or a forward gear, it may be desirable to provide additional assistance to the operator by displaying any objects that are in proximity to or adjacent the front of the machine 10 with a bird's eye view of the machine.

If the transmission 14 was not recently shifted into drive or a forward gear, and no objects are within the range of object detection sensors 31, a front directional view may be generated including an image from the front or first camera 37*a*. If desired, images from the right or second camera 37*b* and the left or fourth camera 37*d* may be combined with the image from the first camera 37*a* to expand the field of vision. If one or more objects are detected, the controller 21 may generate a standard bird's eye view of the area surrounding the machine 10 to permit an operator to see all of the obstacles and provide some degree of spatial relationship between the detected object or objects and the machine 10.

If the transmission 14 is in reverse and no objects are detected within a predetermined range, a rear directional view including an image from the rear or third camera 37*c* may be generated. If desired, images from the right or second camera 37*b* and the left or fourth camera 37*d* may be combined with the image from the rear or third camera 37*c* to expand the field of vision.

If two or more objects are within a predetermined range from the machine 10, a standard bird's eye view of the area surrounding the machine 10 may be generated. If one object is detected within the predetermined range from the machine 10, a rear directional view may be generated until the machine is less than a predetermined distance from the object. At such point, the image may be changed to a shifted bird's eye view in which the bird's eye view is shifted towards the detected object.

In addition to the selected image being dependent upon the state of the transmission 14, the image may also be dependent on the state of the machine 10 and/or the state of the detected objects. More specifically, the controller 21 may monitor the speed and direction of movement of the machine 10 as well as the speed and direction of movement of any detected objects and use such information to determine which views to select. For example, if relative movement of the machine 10 is away from a detected object, the controller 21 may be configured to disregard the detected object and the view selection process proceeds as that object did not exist. In another example, the relative speeds between a detected object and machine 10 may be monitored so that the view selection process may disregard a detected object if it is passing by machine 10 relatively quickly and the object is at least a predetermined distance away.

If the image display system 35 includes an object identification system 33, the view selection process may also use the identification of the detected objects to determine the view to be selected. For example, the controller 21 may select different views depending on whether the detected objects are fixed or movable obstacles and whether any movable obstacles are machines, light duty vehicles or personnel.

At stage 47, data may be generated by the sensors of the head mountable display system 200 and received by controller 21 or headset controller 206. The data may then be used at stage 48 to determine the pose of the operator's head, both relative to the machine 10 and relative to the work site 100. In one example the sensors may be headset pose sensors 208 that generate headset pose signals that are used with a positioning system remote from the machine 10 to determine the pose of the operator's head relative to a reference outside of the machine 10 (i.e., the work site 100). The controller 21 may then use the pose of the machine 10 together with the pose of the head mountable display system 200 to determine the pose of the head mountable display system relative to the operator cab 15 of the machine.

In another example, the sensors of the head mountable display system 200 may be mapping sensors 211 that scan the area adjacent the operator. If the mapping sensors 211 operate to determine the distance from the mapping sensor to local objects, the control system may generate a map of the interior surface of the operator cab 15. By comparing the generated map to a stored map of the machine (including the interior of the operator cab 15) stored in controller 21 and the known pose of the machine, the pose of the head mountable display system 200 relative to the machine may be determined. Since the pose of the machine 10 is known, the pose of the head mountable display system 200 relative to the work site 100 may also be determined.

In an alternate embodiment, if the mapping sensors 211 operate as part of a computer vision system, the edges of the interior surface of the operator cab 15 may be mapped and compared to a stored map of the machine stored in controller 21 and the known pose of the machine to determine the pose of the head mountable display system 200 relative to the machine 10. As stated above, since the pose of the machine 10 is known, the pose of the head mountable display system 200 relative to the work site 100 may also be determined. Other manners of determining the pose of the head mountable display system 200 are contemplated.

After the pose of the head mountable display system 200 relative to the work site 100 has been determined, augmented reality overlays may be generated at stage 49. Controller 21 may generate various overlays including a plurality of lines that extend parallel to the path of movement of the machine 10 and are located at predetermined distances from the sides of the machine. These lines may assist the operator in guiding the machine 10 as it moves about the work site 100. In addition, detected objects, both stationary and movable, may be highlighted with an overlay. Distances to the various objects may also form a portion of the overlay, if desired.

At decision stage 50, controller 21 may determine the extent to which the operator's view of the work site 100 is obstructed. In one example, a data map of the machine 10 may include a data map of the interior of the operator cab 15 together with poses of the head mountable display system 200 within the cab that have obstructed views. By determining the position of the head mountable display system 200 relative to the operator cab 15, the extent to which the operator's view of the work site 100 is obstructed may be determined. More specifically, the pose of the operator cab 15 may be determined based upon the pose of the machine 10 and the data map of the machine, which includes the operator cab. The extent that the view of the work site 100 is obstructed may be determined by comparing the pose of the head mountable display system 200 to the data map of the interior of the operator cab 15 and adjusting the data map based upon the pose of the operator cab 15.

If the operator's view of the work site 100 is obstructed by greater than a predetermined percentage, the controller 21 may at stage 51 utilize the camera view selected at stage 46. In one example, the predetermined percentage of obstruction may be 25%. Other percentages may be used as desired. It is believed that some examples may use a predetermined percentage as low as 10-15% or as high as 40-50%. It is contemplated that in some embodiments, the operator or management personnel may be able to set the predetermined percentage within the controller 21. The predetermined percentage may also be based upon type of machine and the type of environment at which it is operating.

The controller 21 may determine at stage 52 the initial positions of the overlays and the camera view to be projected onto the display screen 202 of the head mountable display system 200. The positions of the overlays may be based upon the content of the overlays and the pose of the head mountable display system 200. The camera view may be positioned in any of a plurality of positions on the display screen 202 of the head mountable display system 200. In one example, a camera view default position, such as at the top right corner of the display screen 202, may be chosen. If, however, a portion of an overlay and the camera view overlap, it may be desirable to move the camera view to another location on the display screen 202. Accordingly, a progression of positions for the camera view may be stored within controller 21 whereby the position of the camera view is changed until the overlays and the camera view no longer overlap.

In some embodiments, it may be desirable to prevent the projection of overlays and/or camera views onto the display screen 202 when such projection might block or obstruct the operator's view of components within the operator cab 15 such as input devices 17 or instrument arrays 18. Accordingly, the operator cab 15 may include surfaces that are designated as no draw zones over which the overlays and camera views should not be projected. To do so, a no draw zone data map may be stored within controller 21 that prevents images from being projected onto certain portions of the display screen 202 when the head mountable display system 200 is at predetermined poses within or relative to the operator cab 15.

The controller 21 may utilize the pose of the head mountable display system 200 and the pose of the machine 10 to determine the pose of the head mountable display system 200 relative to the interior of the operator cab 15. The controller 21 may then compare the pose of the head mountable display system 200 relative to the interior of the operator cab 15 to the no draw zone data map to determine at stage 53 whether any portions of the initial headset images will obstruct components within the operator cab. If a portion of the camera view is within a no draw zone, the controller 21 or headset controller 206 may move at stage 54 the location of the camera view on the display screen 202 so that it is not within a no draw zone and thus does not obstruct components within the operator cab 15. The position to which the camera view is moved may also be stored in a data map.

If a portion of the augmented reality overlay is within a no draw zone, the controller 21 or headset controller 206 may delete at stage 55 the portion of the overlay that is within the no draw zone.

At stage 56, the headset controller 206 may generate and display headset image including the augmented reality overlay and the camera view on the display screen 202 of head mountable display system 200.

If the operator's view of the work site 100 is obstructed by less than a predetermined percentage at decision stage 50, the controller 21 may determine at decision stage 57 whether an object has been detected in proximity to the machine 10. If an object has not been detected, the controller 21 may be configured to omit prepare the camera view selected at stage 46. At stage 52, the controller 21 may determine the initial positions of the overlays to be projected onto the display screen 202 of the head mountable display system 200 and stages 53, 55, and 56 repeated and the headset image is displayed.

If an object has been detected at decision stage 57, the controller 21 may determine at decision stage 58 whether the object is within the operator's field of view. If the object is within the operator's field of view, the controller 21 may generate an overlay to highlight the detected object. Such overlay may identify the object with colors, text, or any other desired information. If desired, the distance to such detected object may also be included in the overlay. At stage 52, the controller 21 may determine the initial positions of the overlays and the camera view to be projected onto the display screen 202 of the head mountable display system 200 and stages 53-56 repeated and the headset image is displayed.

If the detected object is not within the operator's field of view at decision stage 58, controller 21 may prepare the camera view selected at stage 46 and generate an overlay onto the camera view to highlight the detected object. As with the overlay of an object within the operator's field of view, the overlay may identify the object with colors, text, or any other desired information as well as the distance to such detected object. At stage 52, the controller 21 may determine the initial positions of the overlays and the camera view to be projected onto the display screen 202 of the head mountable display system 200 and stages 53-56 repeated and the headset image is displayed.

INDUSTRIAL APPLICABILITY

The industrial applicability of the system described herein will be readily appreciated from the foregoing discussion. The foregoing discussion is applicable to machines 10 that are operated at a work site 100 and are used with a head mountable display system 200. The head mounted display system 200 may be used at a mining site, a landfill, a quarry, a construction site, a roadwork site, a forest, a farm, or any other area in which it is desired to improve the efficiency and visibility of a machine operator.

The head mountable display system 200 may include a visual image system 36 mounted on machine 10 for generating image data from a plurality of points of view relative to the machine and a head mountable display device 201 configured to be mounted on a machine operator's head. The head mountable display device 201 may include a display screen 202, a headset pose sensor system 207 for generating headset pose signals indicative of a position and an orientation of the head mountable display device relative to the work site 100. A controller 21 may be associated with the head mountable display system 200 and be configured to receive the image data from the visual image system 36, to generate a camera image based upon the image data, to generate an augmented reality overlay based upon the position and the orientation of the machine operator's head relative to the work site 100. The controller 21 may be further configured to determine an image to be rendered on the head mountable display device 201 based upon the camera image and the augmented reality overlay and to render the image on the display screen 202.

Head mountable display system 200 provides a system to increase the efficiency of operation of a machine 10. In one instance, the system enhances the awareness of an operator of machine 10 to objects adjacent the machine while minimizing the need for an operator to move their eyes from the work site. In another instance, if an operator is looking at components within the operator cab 15 such input devices 17 or instrument arrays 18, an image on the head mountable display device may be positioned on the display screen 202 so as not to block or interfere with the operator's view of the components.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A head mountable display system for use at a work site, comprising:
   a visual image system mounted on a machine for generating image data from a plurality of points of view relative to the machine;
   a head mountable display device configured to be mounted on an operator's head, the head mountable display device including a display screen;
   a headset pose sensor system associated with the head mountable display device for generating headset pose signals indicative of a position and an orientation of the head mountable display device relative to the work site;
   a sensor system associated with the head mountable display device for determining the position and the orientation of the head mountable display device relative to the interior of the operator cab;
   a pose sensing system for determining the position and the orientation of the machine relative to the work site; and
   a controller configured to:
      receive the image data from the visual image system;
      generate a camera image based upon the image data;
      generate an augmented reality overlay based upon the position and the orientation of the operator's head relative to the work site;
      determine an image to be rendered on the head mountable display device based upon the camera image and the augmented reality overlay; and
      render the image on the display screen;
      determine whether a portion of the image is within a no draw zone based upon a position and an orientation of the head mountable display device relative to an interior of an operator cab;
      determine the position and the orientation of the head mountable display device relative to the interior of the operator cab;
      determine the position and the orientation of the head mountable display device relative to the interior of the operator cab based upon the position and the orientation of the head mountable display device relative to the work site and the position and the orientation of the machine relative to the work site.

2. The head mountable display system of claim 1, wherein the controller is further configured to determine a percentage of obstruction of an operator's view of the work site and the camera image is rendered if the percentage of obstruction is greater than a predetermined percentage.

3. The head mountable display system of claim 1, wherein the controller is further configured to modify the image so that the image is not rendered within the no draw zone.

4. The head mountable display system of claim 1, further including a mapping system associated with the head mountable display device for determining a position and an orientation of the head mountable display device relative to the interior of the operator cab.

5. The head mountable display system of claim 4, wherein the mapping system is configured to determine a range and direction to objects within the interior of the operator cab.

6. The head mountable display system of claim 4, wherein the mapping system includes a computer vision system.

7. The head mountable display system of claim 1, further including a machine sensor associated with the machine for sensing a state of the machine, and wherein the controller is further configured to sense a state of the machine based upon the machine sensor, and the camera image is generated based upon the state of the machine and any objects in proximity to the machine.

8. The head mountable display system of claim 7, further including an object detection system for detecting objects in proximity to the machine, and the controller is further configured to identify objects in proximity to the machine based upon the object detection system.

9. The head mountable display system of claim 8, wherein the controller is configured to determine the augmented reality overlay based upon on a type of object identified.

10. The head mountable display system of claim 1, wherein the camera image is generated by combining the image data from the plurality of points of view.

11. A controller-implemented method of rendering images on a head mountable display system of an operator at a work site, comprising:
   receiving image data from a visual image system mounted on a machine for generating image data from a plurality of points of view relative to the machine;
   generating a camera image based upon the image data;
   generating an augmented reality overlay based upon a position and an orientation of an operator's head relative to the work site;

determining an image to be rendered on a head mountable display based upon the camera image and the augmented reality overlay;

determining whether a portion of the image is within a no draw zone based upon a position and an orientation of the head mountable display device relative to an interior of an operator cab, and modifying the image so that the image is not rendered within the no draw zone;

determining the position and the orientation of the head mountable display device relative to the interior of the operator cab based upon the position and the orientation of the head mountable display device relative to the work site and the position and the orientation of the machine relative to the work site; and rendering the image on a display screen of the head mountable display device.

12. The method of claim 11, further including determining a percentage of obstruction of an operator's view of the work site and rendering the camera image if the percentage of obstruction is greater than a predetermined percentage.

13. The method of claim 12, further including determining the position and the orientation of the head mountable display device relative to the interior of the operator cab based upon a sensor system associated with the head mountable display device.

14. The method of claim 11, further including determining a position and an orientation of the head mountable display device relative to the interior of the operator cab based upon a mapping system associated with the head mountable display device.

15. A machine comprising:
a propulsion system;
a visual image system mounted on the machine for generating image data of a work site from a plurality of points of view relative to the machine;
a head mountable display device configured to be mounted on an operator's head, the head mountable display device including a display screen;
a headset pose sensor system associated with the head mountable display device for generating headset pose signals indicative of a position and an orientation of the head mountable display device relative to the work site;
a sensor system associated with the head mountable display device for determining the position and the orientation of the head mountable display device relative to the interior of the operator cab;
a pose sensing system for determining the position and the orientation of the machine relative to the work site; and
a controller configured to:
receive the image data from the visual image system;
generate a camera image based upon the image data;
generate an augmented reality overlay based upon the position and the orientation of the operator's head relative to the work site;
determine an image to be rendered on the head mountable display based upon the camera image and the augmented reality overlay; and
render the image on the display screen;
determine whether a portion of the image is within a no draw zone based upon a position and an orientation of the head mountable display device relative to an interior of an operator cab;
determine the position and the orientation of the head mountable display device relative to the interior of the operator cab;
determine the position and the orientation of the head mountable display device relative to the interior of the operator cab based upon the position and the orientation of the head mountable display device relative to the work site and the position and the orientation of the machine relative to the work site.

* * * * *